US008444475B2

(12) United States Patent
Hsu

(10) Patent No.: US 8,444,475 B2
(45) Date of Patent: May 21, 2013

(54) METHOD OF REIMBURSEMENT FOR BONUS GAMES OF SLOT MACHINES

(76) Inventor: Tien-Shu Hsu, Taichiu (TW)

( * ) Notice: Subject to any disclaimer, the term of this patent is extended or adjusted under 35 U.S.C. 154(b) by 18 days.

(21) Appl. No.: 12/987,747

(22) Filed: Jan. 10, 2011

(65) Prior Publication Data

US 2012/0178526 A1 Jul. 12, 2012

(51) Int. Cl.
*A63F 13/00* (2006.01)

(52) U.S. Cl.
USPC .......................................................... 463/20

(58) Field of Classification Search ............... 463/16–20
See application file for complete search history.

(56) References Cited

U.S. PATENT DOCUMENTS 5,788,240 A * 8/1998 Feinberg ...................... 273/274
5,851,010 A * 12/1998 Feinberg ...................... 273/274
5,910,048 A * 6/1999 Feinberg ........................ 463/25
2002/0039921 A1* 4/2002 Rowe et al. .................... 463/25
2003/0060266 A1* 3/2003 Baerlocher .................... 463/20

* cited by examiner

*Primary Examiner* — David L Lewis
*Assistant Examiner* — Eric M Thomas
(74) *Attorney, Agent, or Firm* — Muncy, Geissler, Olds & Lowe, PLLC

(57) ABSTRACT

A method of reimbursement for a bonus game adopted for slot machines. It is executed when a bonus game is finished. The method includes steps of: executing a reimbursement judgment module, executing a reimbursement game module, executing a win judgment module and executing a score calculation module. The reimbursement judgment module judges whether a player has reached a set threshold in the bonus game, and repeatedly executes the reimbursement game module until reaching the set threshold to accumulate bonus game scores. After the win judgment module has judged that a reimbursement set threshold is reached, stop execution of the reimbursement game module. Finally, the score calculation module calculates the bonus game scores and stops the bonus game. The method assures the player to earn a certain profit in the bonus game to satisfy the expectation and increase the excitation, and attracts the player to play the slot machine.

5 Claims, 5 Drawing Sheets

METHOD OF REIMBURSEMENT FOR BONUS GAMES OF SLOT MACHINES

FIELD OF THE INVENTION

The present invention relates to a bonus game of slot machines and particularly to a method of reimbursement for a bonus game adopted for slot machines.

BACKGROUND OF THE INVENTION

Please refer to FIG. 1 for a slot machine 1, which is one of the popular gaming machines. After a player stakes a bet, a plurality of reels 2 can be activated to spin. When the reels 2 stop, the alignments of symbols are formed to obtain scores for a bonus game. If a specific symbol is appeared or satisfied a preset condition, the player is awarded to play the bonus game. The bonus game has features of free spins, multiple scores and lock of appeared wild symbol. Hence the player has greater probability to obtain higher bonus game scores without extra expense and is excited by the expectation of hitting jackpot. This is one of the important features of the slot machine 1 to attract players.

However, under completely random setting, even in the bonus game with greater probability of winning, there is also possibility of failing to obtain alignments to hit jackpot and results in no wining or less scores awarded. The player could be easily discouraged or feel frustrated because of repetitive disappointments of loss or just gaining small awards amid the expectation of winning jackpot, and the motivation to continuously play the slot machine 1 is diminished. As a result, utilization of the slot machine 1 drops, and revenue of the slot machine 1 also decreases.

SUMMARY OF THE INVENTION

The primary object of the present invention is to provide a method of reimbursement to repeatedly execute a reimbursement game module until a reimbursement set threshold is satisfied to get corresponding bonus game scores.

To achieve the foregoing object, the present invention provides a method of reimbursement for a bonus game adopted for slot machines. It is executed when a bonus game is finished. The bonus game aims to get bonus game scores by spinning a plurality of reels to generate symbol alignments. The method includes steps as follows: execute a reimbursement judgment module, execute a reimbursement game module, execute a win judgment module, and execute a score calculation module.

The reimbursement judgment module judges whether a player has reached a set threshold in the bonus game, and repeatedly execute the reimbursement game module until the set threshold is reached to accumulate bonus game scores; after the win judgment module judges that the reimbursement set threshold is reached, stop execution of the reimbursement game module; finally, the score calculation module calculates the bonus game scores and stops the bonus game.

In the bonus game, a reimbursement scheme is added in the invention set forth above. When it is judged that the player does not get a desired amount of scores in the bonus game, i.e. not yet reach the set threshold, the reimbursement scheme is activated so that the player can continuously get bonus game scores through the reimbursement game module; after the reimbursement set threshold is reached, execution of the reimbursement game module is stopped, thus is satisfied the expectation of the player and create much attraction for the player to play the slot machine.

The foregoing, as well as additional objects, features and advantages of the invention will be more readily apparent from the following embodiment and detailed description, which proceeds with reference to the accompanying drawings.

DETAILED DESCRIPTION OF THE PREFERRED EMBODIMENTS

Figure 1:
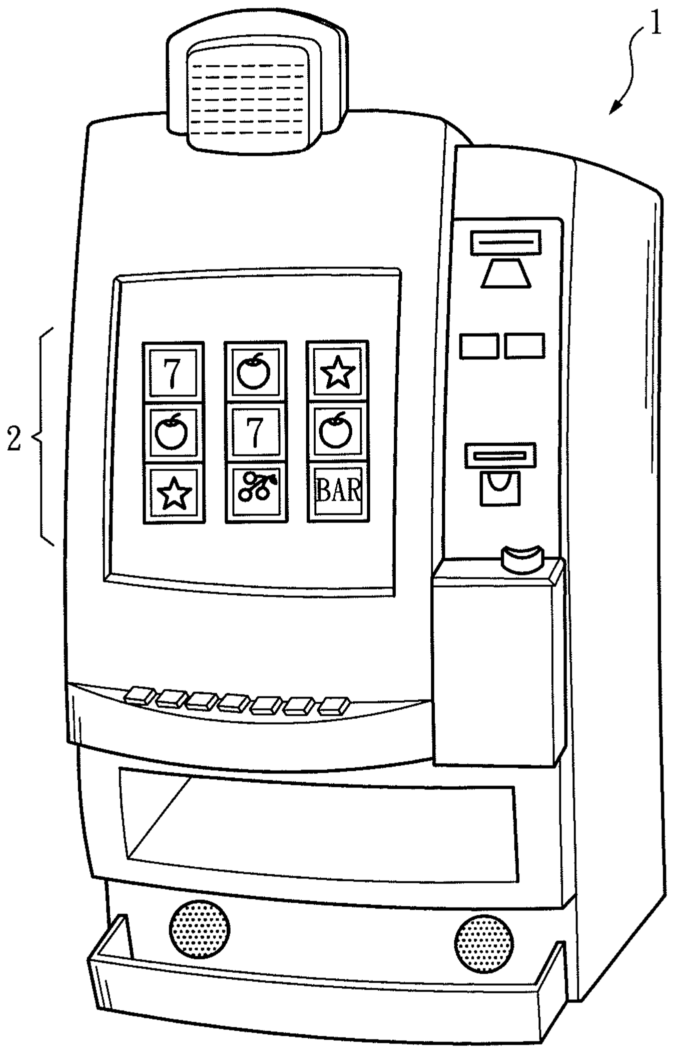
Fig. 1 PRIOR ART
FIG. 1 is a perspective view of a conventional slot machine.
Figure 2:
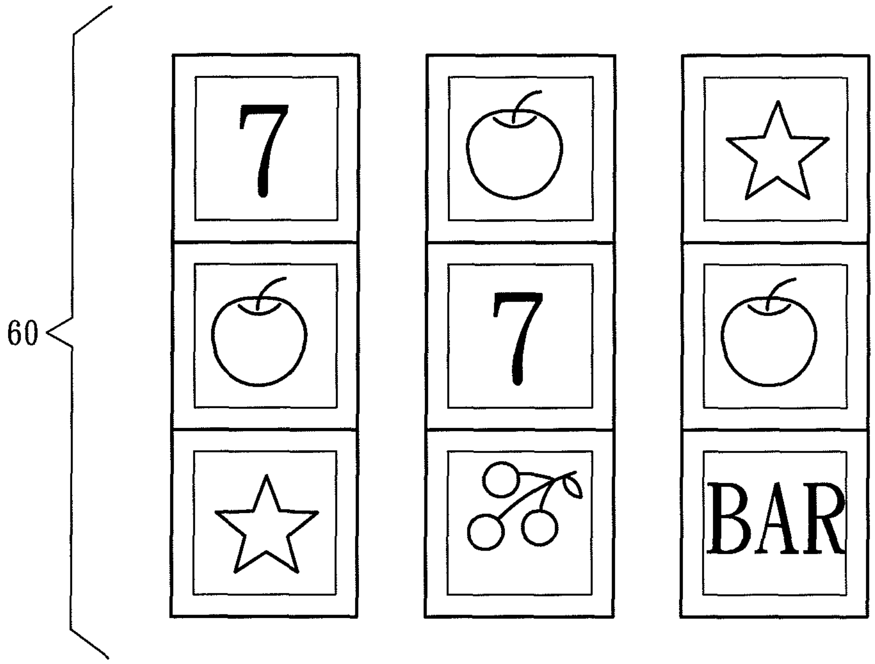
FIG. 2 is a schematic view of a plurality of reels of the invention.
Figure 3:
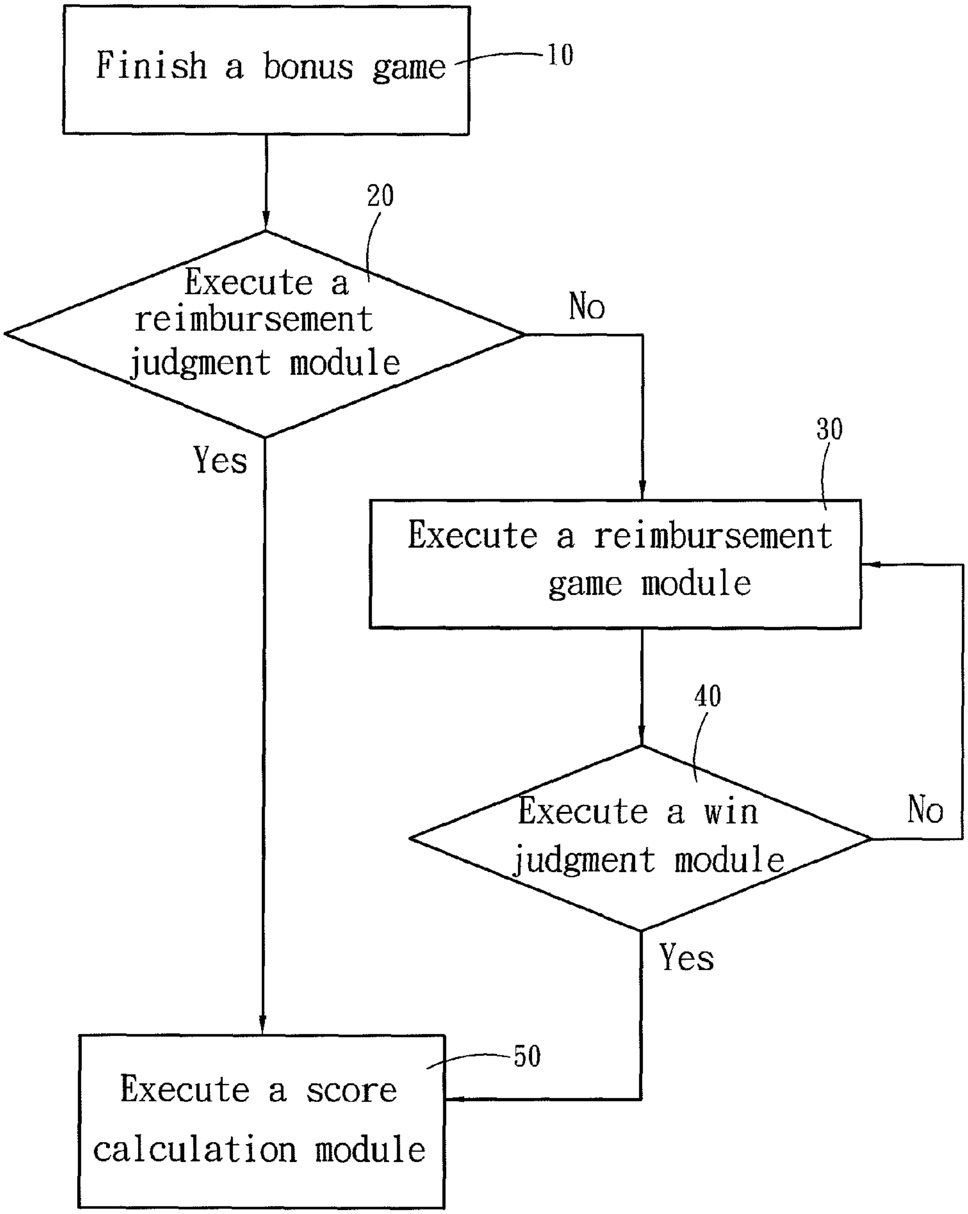
FIG. 3 is a flowchart of the invention.

Please refer to FIGS. 2 and 3, the present invention aims to provide a method of reimbursement for a bonus game adopted for slot machines. It includes steps of: step 10: executing after a bonus game is finished; the bonus game getting bonus game scores by spinning a plurality of reels 60 to generate symbol alignments; step 20: executing a reimbursement judgment module; step 30: executing a reimbursement game module; step 40: executing a win judgment module; and step 50: executing a score calculation module.

Step 20: executing the reimbursement judgment module; judging whether a player has reached a set threshold in the bonus game.

Step 30: executing the reimbursement game module; repeatedly executing the reimbursement game module until the reimbursement set threshold is reached to accumulate bonus game scores;

Step 40: executing the win judgment module; stopping execution of the reimbursement game module after the win judgment module has judged that the reimbursement set threshold is reached.

Step 50: executing the score calculation module; the score calculation module calculating the bonus game scores and stopping the bonus game.

Figure 4:
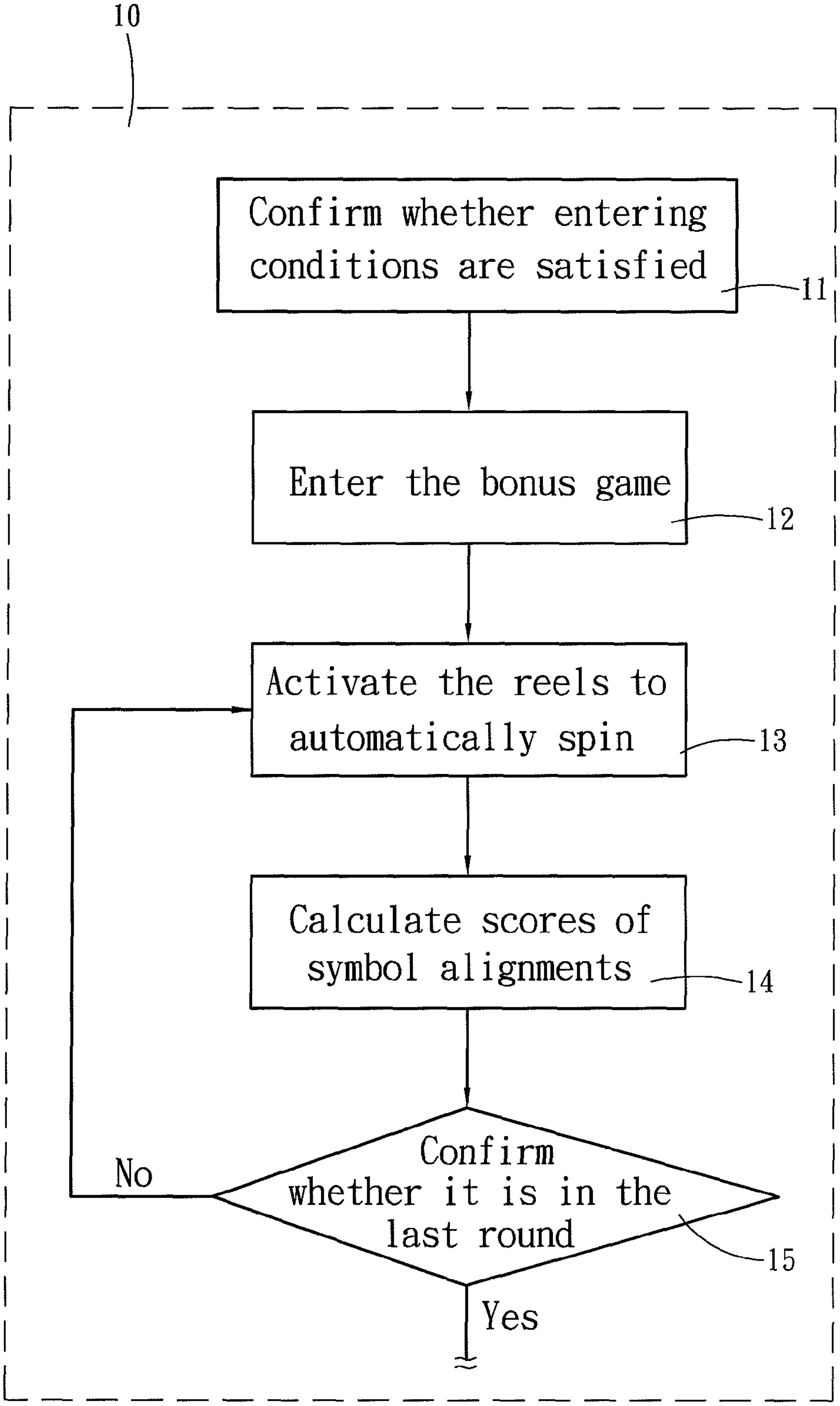
FIG. 4 is a flowchart of the bonus game of the invention.

Please refer to FIG. 4 for the steps of executing the bonus game of the invention. It includes steps of: step 11: confirming whether entering conditions are satisfied; step 12: entering the bonus game; step 13: activating the reels to automatically spin; step 14: calculating scores of the symbol alignments; step 15: confirming whether it is in the last round; if yes, finishing the bonus game; if no, repeating step 13 to activate the reels to automatically spin.

Figure 5:
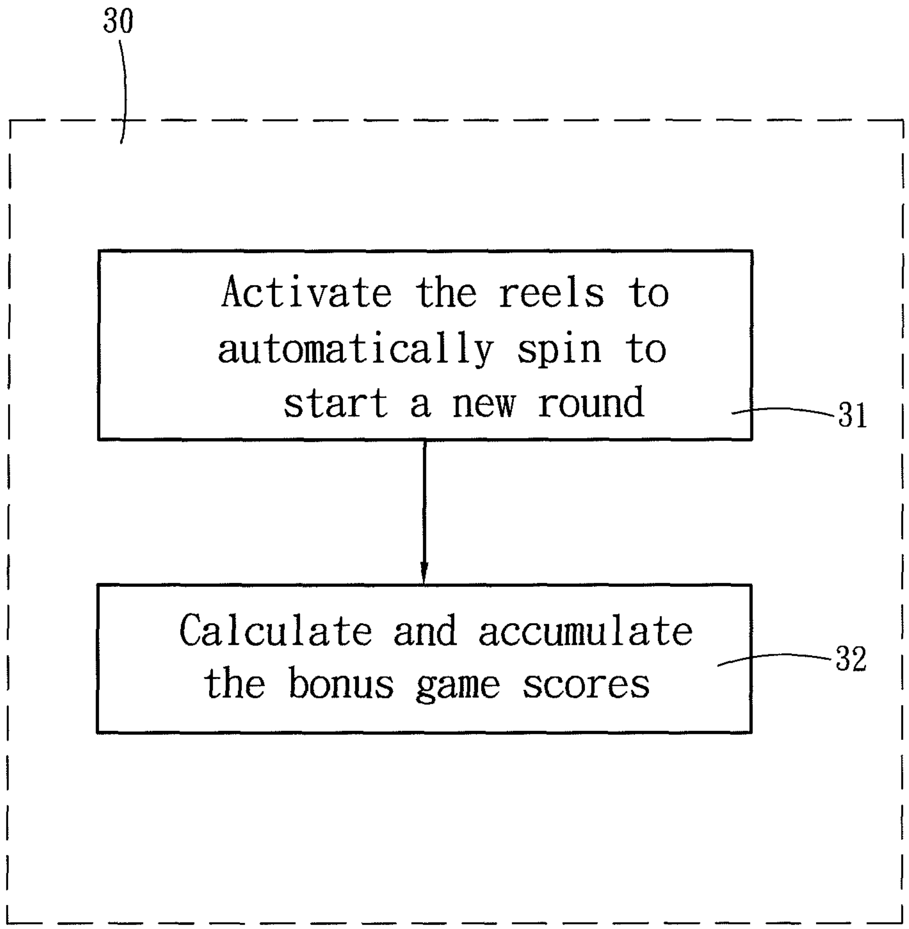
FIG. 5 is a flowchart of the reimbursement game module of the invention.

Please refer to FIG. 5 for the steps of executing the reimbursement game module. It includes steps of: step 31: activating the reels to automatically spin; and step 32: calculating and accumulating bonus game scores.

It is to be noted that the set threshold of the invention may be set according to requirements without restrictions, so does the reimbursement set threshold. The reimbursement set threshold can be set at a value higher than that of the set threshold so that after the player has entered the reimbursement game, he/she can win a certain big award. Thus this feature not only provides reimbursement, but also motivates the player to play the reimbursement game. Two embodiments are discussed below as examples, but not the limitations of the invention.

First embodiment: the set threshold and reimbursement set threshold can be the accumulated bonus game scores of continuous games greater than a designated multiple of a bet per unit: in the bonus game, in order to accelerate accumulation speed of the bonus game scores, the bonus game scores can be set to be increased by a multiple of the number of continuous games; for instance, the accumulated bonus game scores of the first bonus game has a multiple of one, the accumulated bonus game scores of the second bonus game has a multiple of two, the accumulated bonus game scores of the Nth bonus game has a multiple of N. Take ten continuous games as an example, the accumulated bonus game scores of the tenth bonus game has a multiple of ten. In such a condition, "accumulated bonus game scores of continuous games greater than eight times of the bet per unit" can be set as the set threshold. When the accumulated bonus game scores do not reach the set threshold, proceed step 30 to accumulate the bonus game scores through the reimbursement game module. The reimbursement set threshold can be selected to set equal to or higher than the set threshold. With the accumulation speed at ten times of the bonus game scores, the reimbursement set threshold can be reached quickly to provide an exciting anticipation of winning the jackpot for the player.

Second embodiment: the set threshold and reimbursement set threshold can be the number of a wild symbol appeared on the reels greater than a designated ratio of the numbers of the reels; the wild symbol is a special symbol which can represent any symbol in the bonus game, and can be locked without spinning once it is appeared on the reels. The more continuous bonus games are undertaken, the more wild symbols are locked, and the more symbol alignments are generated. In other words, when the numbers of the locked wild symbols have reached a certain quantity, it can be inferred that the player has gotten sufficient bonus game scores. For instance, "the number of the wild symbol appeared on the reels being 33% of the numbers of the reels" can be set as the set threshold; when the ratio of the appearance of the wild symbol is less than 33%, the wild symbols of the reels are locked and step 30 is proceeded to continuously accumulate the bonus game scores through the reimbursement game module until the ratio of the appearance of the wild symbol is greater than the reimbursement set threshold.

As a conclusion, in a bonus game, the reimbursement judgment module of the invention judges whether the player has reached the set threshold. When the set threshold is not reached, the reimbursement scheme can be activated to allow the player to continuously get bonus game scores and stop execution of the reimbursement game module once the reimbursement set threshold is reached. Thus the player can be assured to earn a profit in the bonus game to realize anticipation and to attract the player to play the slot machine.

What is claimed is:

1. A method of reimbursement for a bonus game of a slot machine, a player staking a bet on a slot machine to activate a plurality of reels to spin, when the plurality of reels being stopped and symbols of the plurality of reels forming alignments and satisfying a preset condition, a bonus game being entered and played; during the bonus game, the alignments of the symbols generated by spinning of the plurality of reels being calculated to get and accumulate bonus game scores, the method comprising steps of:

presetting a set threshold in the bonus game;

executing a reimbursement judgment module to judge whether the accumulated bonus game scores reach the set threshold in the bonus game; if the set threshold is not yet reached, a reimbursement game module is entered and a reimbursement game is played, and a reimbursement set threshold is further set in the reimbursement game if the set threshold is reached, a score calculation module is executed to calculate the bonus game scores and stop the bonus game;

executing repeatedly the reimbursement game module until the reimbursement set threshold is reached to accumulate the bonus game scores;

executing a win judgment module and stopping execution of the reimbursement game module, and executing the score calculation module to calculate the bonus game scores and stop the bonus game after the win judgment module has judged that the reimbursement set threshold is reached.

2. The method of claim 1, wherein the bonus game includes steps of:

confirming whether entering conditions are satisfied;

entering the bonus game;

activating the reels to automatically spin;

calculating scores of the symbol alignments; and confirming whether it is in a last round; if yes, finishing the bonus game; if no, repeating activating the reels to automatically spin.

3. The method of claim 1, wherein the step of executing the reimbursement game module further includes steps of:

activating the reels to automatically spin; and calculating and accumulating the bonus game scores.

4. The method of claim 1, wherein the set threshold and the reimbursement set threshold are the accumulated bonus game scores of continuous bonus games greater than a designated multiple of a bet per unit, the accumulated bonus game scores of the bonus games being increased by the multiple of the number of the continuous bonus games.

5. The method of claim 1, wherein the set threshold and the reimbursement set threshold are the number of a wild symbol appeared on the reels greater than a designated ratio of the numbers of the reels, the wild symbol representing any symbol in the bonus game and being locked without spinning when appeared on the reels.

* * * * *